United States Patent
Shieh (10) Patent No.: US 9,515,772 B2
(45) Date of Patent: Dec. 6, 2016

(54) METHOD OF RADIO COVERAGE EXTENSION AND BASE STATION USING THE SAME

(71) Applicant: Industrial Technology Research Institute, Hsinchu (TW)

(72) Inventor: Shin-Lin Shieh, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 170 days.

(21) Appl. No.: 14/520,347

(22) Filed: Oct. 22, 2014

(65) Prior Publication Data
US 2015/0124741 A1 May 7, 2015

Related U.S. Application Data

(60) Provisional application No. 61/898,485, filed on Nov. 1, 2013.

(51) Int. Cl.
*H04L 1/00* (2006.01)
*H04L 1/08* (2006.01)
(Continued)

(52) U.S. Cl.
CPC ......... *H04L 1/0007* (2013.01); *H04L 1/0013* (2013.01); *H04L 1/08* (2013.01); *H04W 16/26* (2013.01)

(58) Field of Classification Search
CPC .......... H04L 1/00; H04W 16/26; H04W 52/04
See application file for complete search history.

(56) References Cited

U.S. PATENT DOCUMENTS 8,059,542 B1* 11/2011 Oroskar ............... H04L 1/0006
370/235
2004/0100896 A1* 5/2004 Vayanos ............... H04L 1/0002
370/201
(Continued)

FOREIGN PATENT DOCUMENTS

TW 201342855 10/2013
WO 2013141657 9/2013

OTHER PUBLICATIONS

3GPP, "PBCH coverage extension for MTC devices," 3GPP TSG-RAN WG1 Meeting #72bis, R1-130938, Apr. 15-19, 2013, pp. 1-4.
(Continued)

*Primary Examiner* — Xavier Szewai Wong
(74) *Attorney, Agent, or Firm* — Jianq Chyun IP Office (57) ABSTRACT

The present disclosure is directed to a method of radio coverage extension and a base station using the same method. According to one of the exemplary embodiments, the base station transmits system information in a radio frame through a broadcast channel and selects a payload structure of repetitive system information from a plurality of predefined payload structures that includes the first payload structure and a second payload structure. The size of first payload structure is greater than the size of second payload structure. The base station transmits within the same radio frame a plurality of the repetitive system information having the payload structure through the broadcast channel in response to transmitting the system information. If the first payload structure mode is selected, there are N1 repetitive system information. If the second payload structure is selected, there are N2 repetitive system information where N2 is smaller than or equal to N1.

20 Claims, 9 Drawing Sheets

(51) Int. Cl.
*H04W 16/26* (2009.01)
*H04W 52/04* (2009.01)

(56) References Cited

U.S. PATENT DOCUMENTS

| | | | |
|---|---|---|---|
| 2005/0124372 A1* | 6/2005 | Lundby | H04W 52/146 455/522 |
| 2010/0203866 A1* | 8/2010 | Li | H04L 1/0045 455/411 |
| 2013/0136098 A1 | 5/2013 | Li et al. | |
| 2013/0250878 A1 | 9/2013 | Sayana et al. | |
| 2013/0301524 A1 | 11/2013 | Xu et al. | |
| 2014/0044056 A1 | 2/2014 | Chen et al. | |
| 2014/0071957 A1 | 3/2014 | Xu et al. | |
| 2014/0098761 A1* | 4/2014 | Lee | H04W 74/006 370/329 |

OTHER PUBLICATIONS

"Office Action of Taiwan Counterpart Application", issued on Feb. 23, 2016, p. 1-p. 3.
3rd Generation Partnership Project (3GPP), "PBCH Support for Deep Hole MTC Devices," 3GPP TSG RAN WG1 Meeting #75, Nov. 11-15, 2013, pp. 1-4.
3rd Generation Partnership Project (3GPP), "PBCH coverage enhancement for low cost MTC," 3GPP TSG RAN WG1 Meeting #74bis, Nov. 11-15, 2013, pp. 1-3.
3rd Generation Partnership Project (3GPP), "PBCH transmission for MTC coverage enhancement," 3GPP TSG RAN WG1 Meeting #75, Nov. 11-15, 2013, pp. 1-6.
3rd Generation Partnership Project (3GPP), "PBCH Coverage Improvement for MTC Devices," 3GPP TSG RAN WG1 Meeting #75, Nov. 11-15, 2013, pp. 1-3.
3rd Generation Partnership Project (3GPP), "On PBCH Coverage Enhancement for LC-MTC," 3GPP TSG RAN WG1 Meeting #75, Nov. 11-15, 2013, pp. 1-4.
3rd Generation Partnership Project (3GPP), "System information for enhanced coverage MTC UE," 3GPP TSG RAN WG1 Meeting #75, Nov. 11-15, 2013, pp. 1-8.
ITRI, "PBCH Coverage Extension Technique," 3GPP TSG RAN WG1 Meeting #75, R1-135414, Nov. 11-15, 2013, pp. 1-3.
LG Electronics, "Initial procedure and consideration points for the coverage enhancement of MTC UEs," 3GPP TSG RAN WG #74, R1-133370, Aug. 19-23, 2013, pp. 1-6.
InterDigital, "PBCH and PRACH for Rel-13 LC-MTC," 3GPP TSG RAN WG1 Meeting #78bis, R1-144207, Oct. 6-10, 2014, pp. 1-4.
Ericsson, "Mode selection for enhanced coverage MTC UE," 3GPP TSG RAN WG1 Meeting #76, R1-140749, Feb. 10-14, 2014, pp. 1-2.
Alcatel-Lucent et al, "Coverage enhancement techniques for PBCH," 3GPP TSG-RAN WG1 Meeting #74bis, R1-134207,Oct. 7-11, 2013, pp. 1-5.
Nokia Siemens Networks et al., "PBCH Coverage Enhancement Performance Results for MTC," 3GPP TSG RAN1 #72bis, R1-131227, Apr. 15-19, 2013, pp. 1-3.
"Office Action of Europe Counterpart Application", issued on Apr. 28, 2016, p. 1-p. 12.

* cited by examiner

FIG. 1

| MIB Content | No. of bits | Comment |
|---|---|---|
| dl-Bandwidth | 3 | Downlink BW configuration |
| phich-Config | 3 | PHICH configuration indication |
| systerFrameNumber | 8 | System Frame Number |
| Spare | 10 | Reserved for Future Use |
| CRC | 16 | Error Detection with False Detection rate$\approx 2^{-16}$ |

| MIB Content | No. of bits | Comment |
|---|---|---|
| dl-Bandwidth | x | x≤14 |
| phich-Config | | |
| systerFrameNumber | | |
| Spare | y | y≤10, the spare bit for MTC UE |
| CRC | z | z≤16 and False Detection rate≒$2^{-z}$ |

| MIB Content | Payload Size 1 | Payload Size 2 | Payload Size 3 | Payload Size 4 |
|---|---|---|---|---|
| dl-Bandwidth | 14 | 14 | 14 | 10 |
| phich-Config | | | | |
| systerFrameNumber | | | | |
| Spare | 10 | 2 | 0 | 0 |
| CRC | 16 | 8 | 6 | 6 |
| Total Payload Size | 40 | 24 | 20 | 16 |

METHOD OF RADIO COVERAGE EXTENSION AND BASE STATION USING THE SAME

CROSS REFERENCE TO RELATED APPLICATION

This application claims the priority benefit of U.S.A. provisional application Ser. No. 61/898,485, filed on Nov. 1, 2013. The entirety of the above-mentioned patent application is hereby incorporated by reference herein and made a part of specification.

TECHNICAL FIELD

The present disclosure is directed to a method of radio coverage extension and a base station using the same method.

BACKGROUND

As LTE technology is being gradually developed, operators would like to reduce the cost of overall network maintenance by minimizing the number of different radio access technologies. Machine-Type Communications (MTC) devices tend to be low-end (i.e. low cost or low data rate) applications that could be handled adequately by Global System for Mobile Communication (GSM) or General Packet Radio Service (GPRS). As more and more MTC devices are deployed in the field, network operators may rely on existing GSM/GPRS networks for these low-end MTC devices. By adopting these low-cost MTC GSM/GPRS devices and with existing GSM/GPRS network, operators would be able to reap the maximum benefits out of their spectrum. In cellular systems, essential information about the cellular network are often carried in broadcast channels, and communicating data over broadcast channels that have sufficient coverage would be an indispensable element of the cellular system.

For example, when a user equipment (UE) initiate a cell search procedure in order to attach to a cell, the UE would be required to obtain information related to the cell identity and frame timing from a broadcast channel such as a physical broadcast channel (PBCH) in the case of a Long Term Evolution (LTE) communication system. If the UE is unable to discern information from the PBCH broadcasted from a cell, the UE would not able to attach to the cell. However, MTC UEs might be located in hard to reach places such as underground. Therefore, in order to minimize costs associated with additional radio access technologies, existing communication infrastructures may need to improve their coverage by an additional 15~20 decibel (dB).

Figure 1:
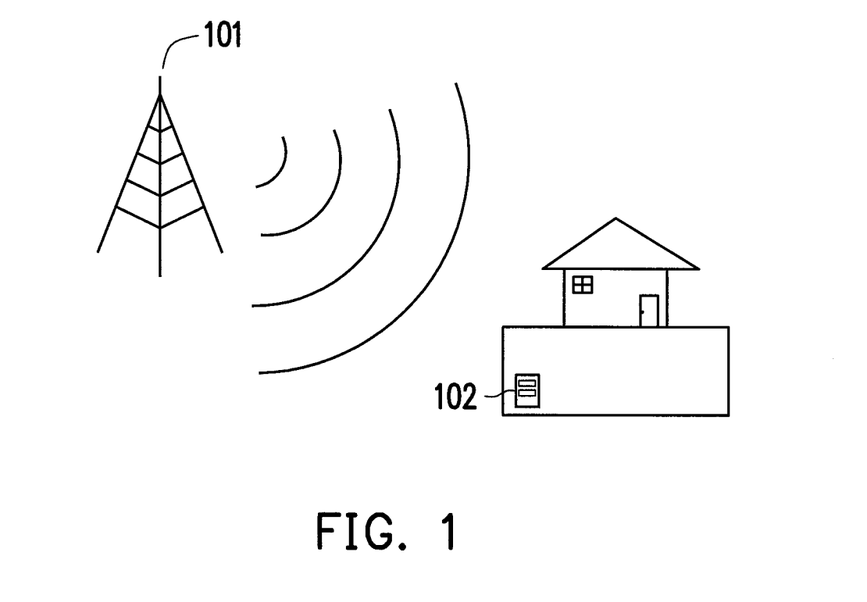
FIG. 1 is an example that illustrates a scenario of a base station communicating with a MTC device.

Such scenario could be illustrated in FIG. 1 in which a base station 101 or an evolved node B (eNB) in the case of LTE is shown to transmit or receive information from a MTC device 102 underneath a house. Without properly discerning the PBCH, the MTC device 102 would be unable to receive needed information in order to attach to the base station 101. Currently, the PBCH would include essential system information transmitted through the master information block (MIB).

Figure 2:
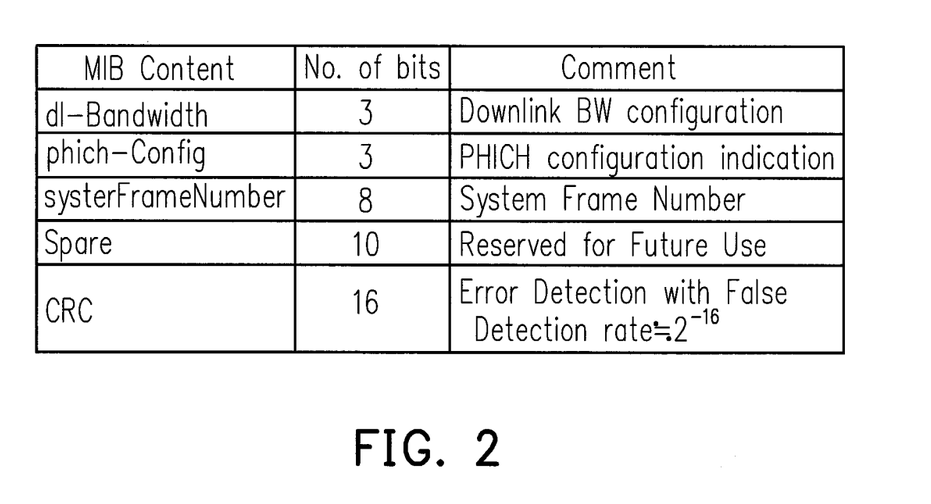
FIG. 2 illustrates a typical content of the MIB.

FIG. 2 illustrates the content of MIB transmitted through the PBCH. The MIB would include the downlink bandwidth information represented by 3 bits, physical hybrid ARQ indicator channel (PHICH) configuration represented by 3 bits, the system frame number represented by 8 bits. The MIB content would further include 10 bits of reserved bits as well as 16 bits of cyclic redundancy check (CRC) for error detection. The MIB content channel will pass through a channel coding and modulation process before transmitted in the PBCH.

Figure 3:
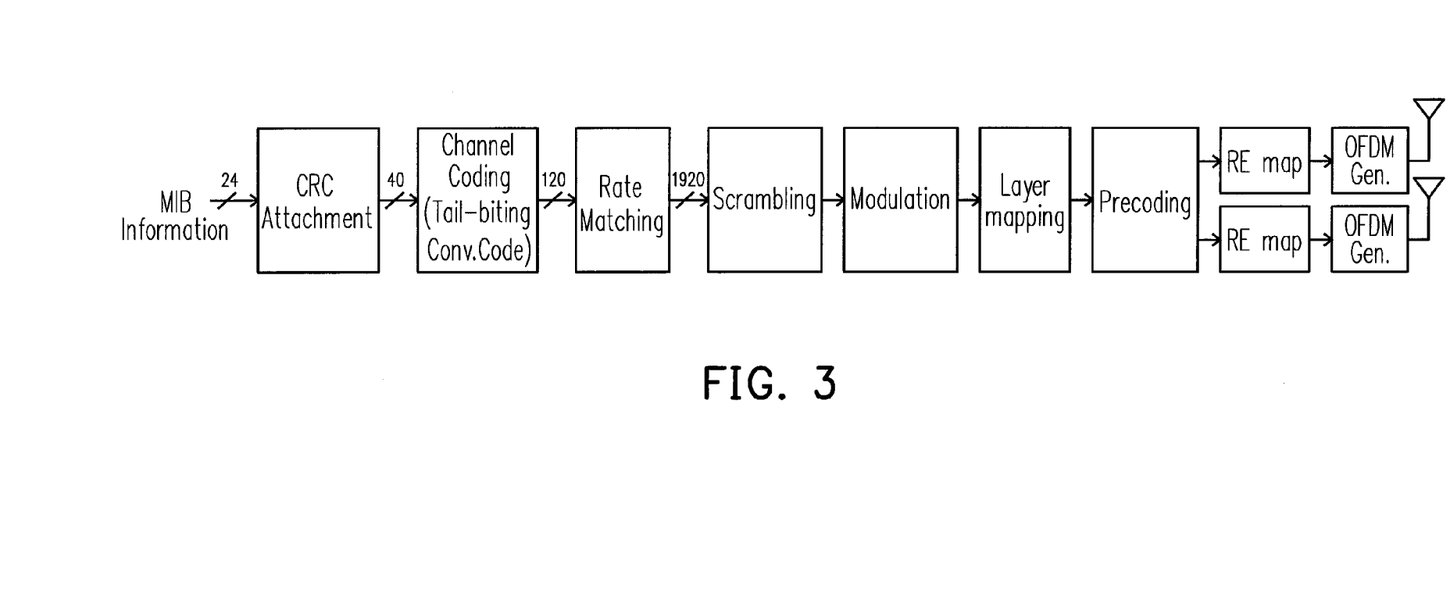
FIG. 3 illustrates a typical channel coding and modulation process of the PBCH.

FIG. 3 illustrates a typical channel coding and modulation process. As shown in FIG. 3, a whole 40-bit content would pass through a channel coding process, a rate matching process, and a scrambling process. In the case of LTE implementation of the MIB in the PBCH transmission, the channel coding process would apply a tail-biting convolutional coding with ⅓ code rate. The rate matching process would then repeats 16 times for a robust transmission, and the scrambling process would be included to mitigate the inter-cell interference. Afterwards, the data would be modulated by QPSK for a low error rate. After modulation, processes involving layer mapping, precoding, resource mapping, and OFDM generation would be applied.

Figure 4:
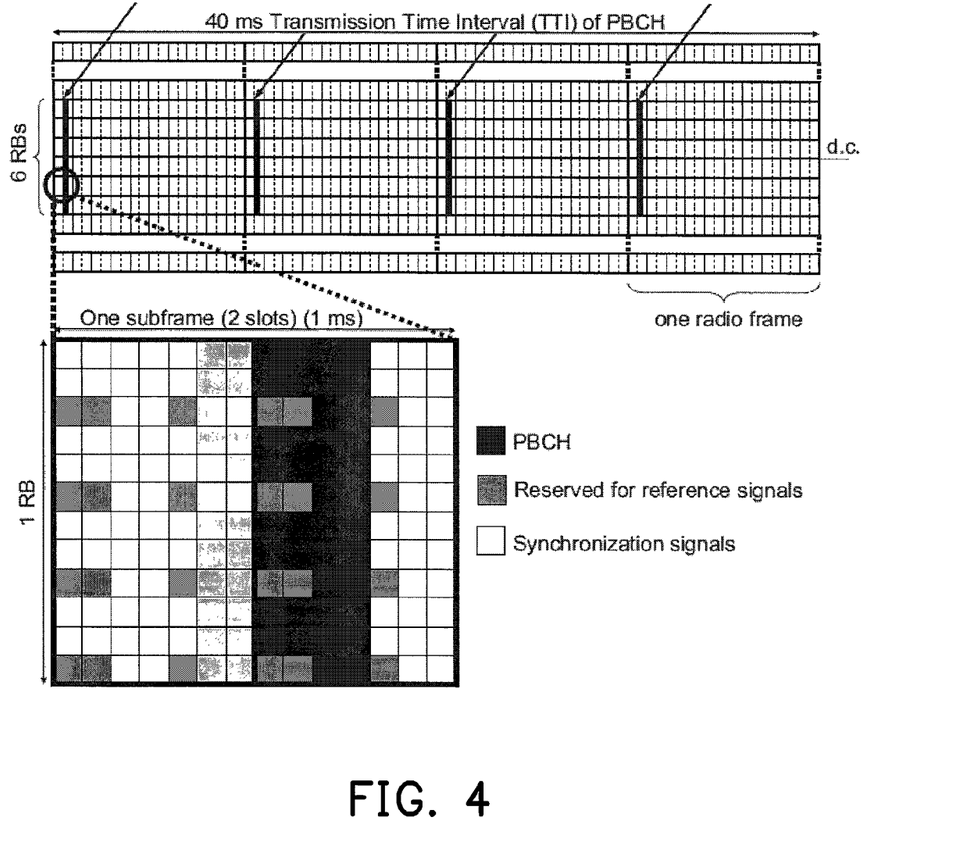
FIG. 4 illustrates a typical PBCH transmission.

FIG. 4 illustrates a typical PBCH transmission. The content of MIB would typically repetitive and transmitted over 40 transmission time intervals (TTI) or 4 radio frames, and each radio frame would carry a segment of the MIB. In each radio frame, a segment of the MIB content would be carried by 6 resource blocks as shown in FIG. 4.

One of the objectives of LTE release 12 for low-cost MTC is to ensure that the service coverage would not be worse than GSM/GPRS so that the service would be at least comparable or may preferably be improved beyond what is possible in order to provide MTC services over GPRS/GSM as of today. A 15 dB improvement in coverage in comparison to defined LTE cell coverage footprint engineered for "normal LTE users (UEs)" should be targeted for low-cost MTC UEs, using very low rate traffic with relaxed latency. Thus, increasing the coverage has been the main concern for release 12.

Figure 5:
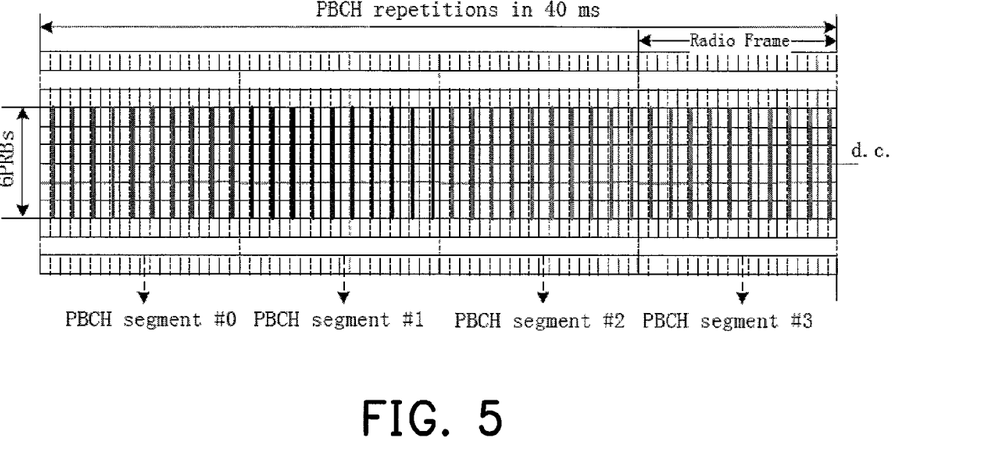
FIG. 5 illustrates a typical concept of repeating PBCH transmissions.

In order to extend the PBCH coverage, one idea could be to increase repetition of the number of MIB transmissions. FIG. 5 illustrates an example of such concept by repeating a segment of MIB content multiple times within each radio frame. In each of the repetitions, a segment of MIB content is repeated identically. In this way, the system coverage of a cell could be extended at the expense of a large amount of system capacity.

SUMMARY OF THE DISCLOSURE

Accordingly, the present disclosure is directed to a method of radio coverage extension and a base station using the same method. The method and the base station would be able to extend the PBCH coverage by reducing the system resources needed to achieve extended coverage.

According to one of the exemplary embodiments, the present disclosure is directed to a radio coverage extension method that includes at least but not limited to the base station transmits system information in a radio frame through a broadcast channel and selects a payload structure of repetitive system information from a plurality of predefined payload structures that includes the first payload structure and a second payload structure. The size first payload structure is greater than the size of second payload structure. The base station then transmits within the same radio frame a plurality of the repetitive system information having the payload structure through the broadcast channel in response to transmitting the system information. If the first payload structure is selected, there number repetitions of the repetitive system information would be N1. If the second payload structure is selected, the number of repetitions of the repetitive system information would be N2, and N2 is smaller than or equal to N1.

In one of the exemplary embodiment, the present disclosure is directed to a base station that includes at least but not limited to a transmitter for transmitting wireless data and a processing circuit coupled to the transmitter. The processing circuit is configured to transmit system information in a radio frame through a broadcast channel and select a payload structure of repetitive system information from a plurality of predefined payload structures that includes the first payload structure and a second payload structure. The size first payload structure is greater than the size of second payload structure. The processing circuit is further configured to transmit within the same radio frame a plurality of the repetitive system information having the payload structure through the broadcast channel in response to transmitting the system information. If the first payload structure mode is selected, the number of repetitions of the repetitive system information would be $N_1$. If the second payload structure is selected, the number of repetitions of the repetitive system information would be $N_2$, and $N_2$ is smaller than or equal to $N_1$.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

It has been commonly understood that reducing payload sizes would result in a channel coding gain. From the perspective of performance, it would thus be better to design a new PBCH content which is called "ePBCH" for MTC UEs instead of re-using the legacy PBCH. In order to enhance the coverage of PBCH, repetitions the content of the PBCH is proposed. The present disclosure proposes using enhanced PBCH or ePBCH by reducing the content of the PBCH so that coding gain can be observed to enhance the coverage of the PBCH. Moreover, a limited and discrete number of ePBCH structures are proposed in order to meet the demands of different scenarios. In this way, different ePBCH structure would result in different coverage extension gains at the costs of system flexibilities and resources. Each base station may decide its own ePBCH structure based on its instantaneous condition by considering, for example, the traffic loading. The receiving UE may blindly decode the ePBCH by trying to decode a limited number of ePBCH candidates. Exemplary embodiments are provided by the FIGs and their corresponding written descriptions as follows.

Figure 6:
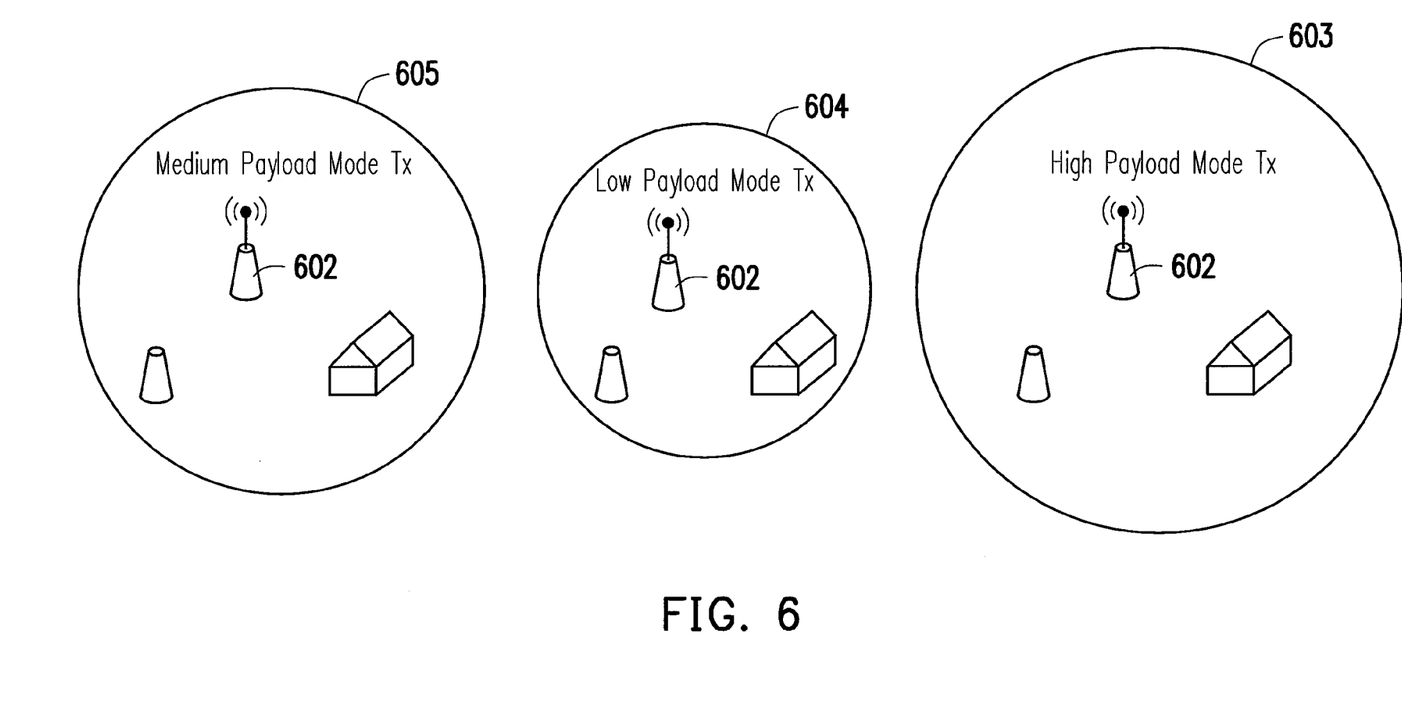
FIG. 6 illustrates a communication system with at least three base stations that chooses among multiple payload structure modes in accordance with one of the exemplary embodiments of the present disclosure.

FIG. 6 illustrates a communication system in which any base station may choose among multiple payload structure modes of PBCH in accordance with one of the exemplary embodiments of the present disclosure. For this particular exemplary embodiment, there are three payload structures or payload modes with different payload sizes. Each of the different payload modes would have a different number of repetitions. Different base stations may select a different payload mode. According to FIG. 6, a base station 602 may choose among a low payload mode 604, a medium payload mode 605, and a high payload mode 603. The MIB content in the high payload mode 603 would have the most information among the three payload modes (603, 604, 605). In other words, the medium payload mode 605 and the low payload mode 604 would have reduced MIB content. The high payload mode 603 may or may not have reduced MIB content. Also the high payload mode 603 would have the most repetition within a radio frame relative to the low payload mode 604 and the medium payload mode 605. Since the high payload mode 603 would be repeated the most times relative to the other two payload modes, the high payload mode 603 would have the most coverage range relative to the other two payload modes as shown in FIG. 6. The low payload 604 would have the smallest coverage range 604. Therefore, the base station 602 may select the low payload mode 604 to have greater coverage range, to better reach hard to reach places, to carry more system information as payload, and to have greater system flexibility in general. On the other hand, the base station 602 may select the low payload mode 604 in order to conserve system resources.

In alternative exemplary embodiment, a system may also choose have two discrete payload modes with each payload mode having a distinct ePBCH structure. For example, a high payload structure with content size $B_1$ and repetition number $N_1$ and a low payload structure with content size $B_2$ and repetition number $N_2$, where $B_1 > B_2$ and $N_1 \geq N_2$ could be used. The high payload structure could for example have a payload size $B_1=40$ and requires $N_1=4$ repetitions to enhance the coverage. On the other hand, the low payload structure has smaller payload size $B_2=24$ and requires only $N_2=2$ repetitions. Based on the same principle, it should be apparent for an ordinary person skilled in the art that there could be more than three payload modes.

In general, a base station may instantaneous select a payload mode to satisfy the needs of the moment. According to one of the exemplary embodiments, a base station may select a payload mode having a predefined ePBCH size and repetition number based on the instantaneous data traffic of the Physical Downlink Shared Channel (PDSCH). For example, assuming that low PDSCH traffic is to be expected between 3 am~5 am in the morning, a high payload mode such as the one in FIG. 6 is selected so that a high number of repetition is required. However, if an unexpected high PDSCH traffic occurs all in a sudden, a base station may change to a low payload such as the one in FIG. 6. By changing to the low payload mode, the number of repetitions can be reduced.

According to one of the exemplary embodiments, a base station may select a payload mode having a predefined ePBCH size and repetition number based on the system flexibility requirement. For example, assuming that a first application requires only a small amount of system information while a second application requires more system information, a base station may choose a low payload mode to process the first application and subsequently select a high payload mode to process the second application. In general, each base station may select from a plurality of discrete payload modes with each payload mode having a predefined ePBCH size and repetition in order to efficiently process a particular application.

According to one of the exemplary embodiments, a base station may select a payload mode having a predefined ePBCH size and repetition number based on the base station type in a cell. For instance, since a Macro cell base station would cover a large area for users with various types of application, a high payload mode would be selected. On the other hand, since a Pico cell base station covers a small area of users with a smaller number of applications, a low payload mode would be selected.

Figure 7:
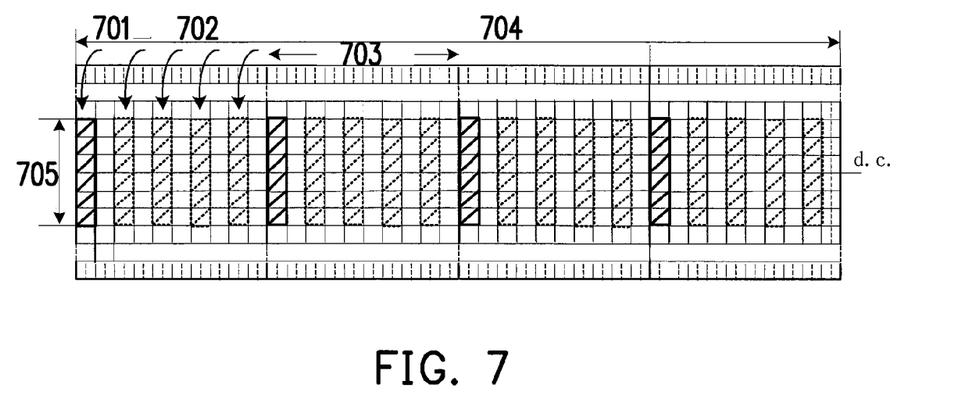
FIG. 7 illustrates repetitions ePBCH in a high payload mode in accordance with one of the exemplary embodiments of the present disclosure.

FIG. 7 illustrates repetitions of ePBCH in a high payload mode in accordance with one of the exemplary embodiments of the present disclosure. According to FIG. 7, the legacy PBCH 701 would be transmitted within 6 physical resource blocks (PRB) 705, and the ePBCH 702 would be repeatedly transmitted for $N_1$ repetition per radio frame 703 for each segment. The transmission of a complete legacy PBCH with repeating ePBCH would be complete within 40 TTI or 4 radio frames.

Figure 8:
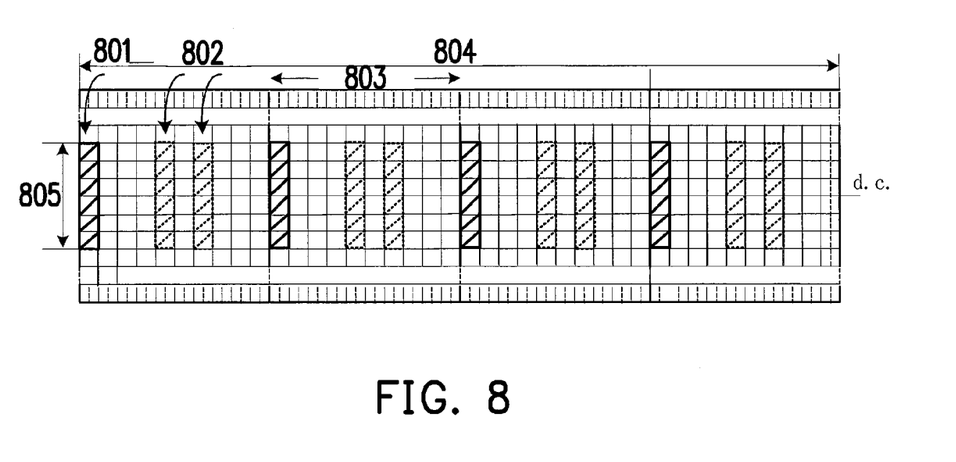
FIG. 8 illustrates repetition ePBCH in a low payload mode in accordance with one of the exemplary embodiments of the present disclosure.

FIG. 8 illustrates repetition of ePBCH in a low payload mode in accordance with one of the exemplary embodiments of the present disclosure. Similarly, legacy PBCH 801 would be transmitted within 6 physical resource blocks (PRB) 805, and the ePBCH 802 would be repeatedly transmitted for $N_2$ repetition per radio frame 803 for each segment. The transmission of a complete legacy PBCH with repeating ePBCH would be complete within 40 TTI or 4 radio frames. $N_2$ is small then $N_1$.

Since the number of possible ePBCH structures is limited to a discrete number of possibilities, the receiver of a UE could blindly decode the ePBCH by trying all ePBCH structure candidates to find the transmitted ePBCH. For each blind decoding attempt, since a UE has known all the payload modes in advance, a UE may decode by assuming that a certain payload mode has been selected by a transmitting base station and know whether the payload mode is the one used by the transmitting base station based on a specific criterion such as whether the CRC generates a correct result. If the CRC does not generate the expected result, then the UE would try to decode by assuming another payload mode.

Figure 9A:
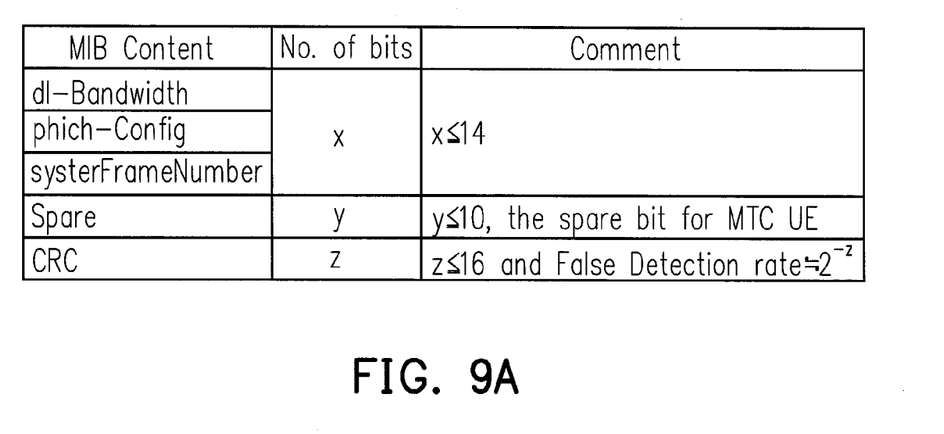
FIG. 9A illustrates the content of ePBCH in accordance with one of the exemplary embodiments of the present disclosure.

FIG. 9A illustrates the content of ePBCH in accordance with one of the exemplary embodiments of the present disclosure. In general, a low payload mode would have less MIB content than a medium or a high payload mode. According to FIG. 2, dl-Bandwidth, phich-config, and SystemFrameNumber would usually have 14 bits total (i.e. 3 bits+3 bits+8 bits=14 bits). However, the full 14 bits may not be entirely necessary.

For example, the dl-Bandwidth could be reduced from 3 bits to 0~2 bits. The dl-Bandwidth may not actually be required for the reason that the system bandwidth might already be fixed or known in advanced, or the system bandwidth might be defined as a small set of discrete possibilities such that the full three bits might not be required.

For another example, although phich-Config specifies the PHICH configuration needed for UEs to be able to find starting position of the physical downlink control channel (PDCCH) in the subframe control region, it is however possible to transmit system information by using system information blocks (SIBs) without using PDCCH. Also the current hybrid automatic re-transmission request (HARQ) might be difficult to use for MTC UEs and repetition of PDCCH for coverage enhancement of MTC UEs might not be feasible. By changing HARQ procedure and by applying enhanced PDCCH (ePDCCH) based solution, the phich-Config might not be required by MTC UEs.

For another example, although the field SystemFrameNumber is required, if PBCH period for more than 40 ms is required, then the number of system frame number (SFN) bits may actually be reduced. Therefore, the combination of dl-Bandwidth, phich-Config and SystemFrameNumber could be reduced from 14 bits to less than 14 bits.

Moreover, the spare bits and CRC bits could also be reduced. According to FIG. 2 which is consistent with the current LTE specification, 10 spare bits have been reserved for future use. However, these 10 spare bits have not been used since Release-8 but are nevertheless required to be kept and would thus contribute to a significant increase of MIB payload.

Furthermore, the current 16 CRC bits ensure that the false detection rate is as low as around $2^{-16}$. Reducing the number of CRC bits may bring some performance gain at the cost of higher false detection rate, which may lead to longer system information acquisition time. However, reducing the CRC size may help balancing the trade-offs between the performance gain and the false detection rate. Therefore, the present disclosure proposes reducing not only the 14 bit content but also the spare CRC bits. As shown in FIG. 9A, the spare bits could be reduced to less than 10 bits for MTC UEs and the CRC size could be reduced to less than 16 bits. Therefore, the overall payload after content reduction from legacy PBCH could be decreased from 40 bits to (x+y+z) bits as shown in FIG. 9A.

Figure 9B:
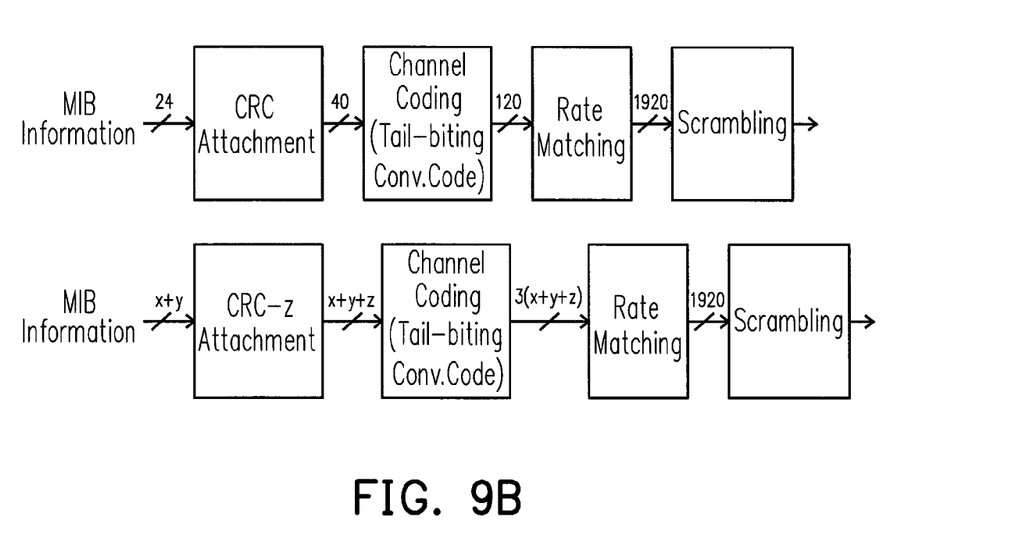
FIG. 9B illustrates the channel coding and modulation of ePBCH in accordance with one of the exemplary embodiments of the present disclosure.

FIG. 9B illustrates the channel coding, rating matching, and scrambling of ePBCH. The result of the process of FIG. 9B would likely result in a reduced payload size from legacy MIB. However, after rate matching, the total number of bits (e.g. 1920) may remain the same. The ePBCH could be repeatedly transmitted several times per 10 millisecond radio frame as shown in FIG. 7 & FIG. 8.

Although both the original MIB content transmitted in PBCH as shown in FIG. 2 and the reduced MIB content transmitted in ePBCH ash shown in FIG. 9 contain spare bits, the spare bits in the reduced MIB content are reserved for future use of MTC UE only. Therefore, the content of spare bits in FIG. 2 could be different from the content of spare bits reserved for MTC UE for future release as shown in FIG. 9. For example, the 40 bit-bit MIB content in FIG. 2 could be denoted as $[m_1 m_2 m_3 \ldots m_{14} s_1 s_2 s_3 \ldots s_{10} c_1 c_2 c_3 \ldots c_{16}]$, where $m_i$, $s_i$, and $c_i$ denote the bandwidth/phich/SFN content, spare, and CRC bits, respectively while the (x+y+z)-bit of reduced MIB content in FIG. 9 would be $[m_1 m_2 m_3 \ldots m_x s_1 s_2 s_3 \ldots s_y c_1 c_2 c_3 \ldots c_z]$. At a later time, some spare bits, for example, $s_1$ and $s_2$, of the reduced MIB content of FIG. 9 could be used to deliver some specific information for MTC UEs so that $[s_1 s_2]$ could be denoted as $[q_1 q_2]$. However, the new specific information, while is used by the MTC UEs, would be transmitted in the repeated transmission as shown in FIGS. 7 and 8. Therefore, the 40-bit MIB content transmitted in the Legacy PBCH in is $[m_1 m_2 m_3 \ldots m_{14} s_1 s_2 s_3 \ldots s_{10} c_1 c_2 c_3 \ldots c_{16}]$ while the reduced MIB content becomes $[m_1 m_2 m_3 \ldots m_x q_1 q_2 s_3 \ldots s_y c_1 c_2 c_3 \ldots c_z]$ in the repeated transmission.

Figure 10:
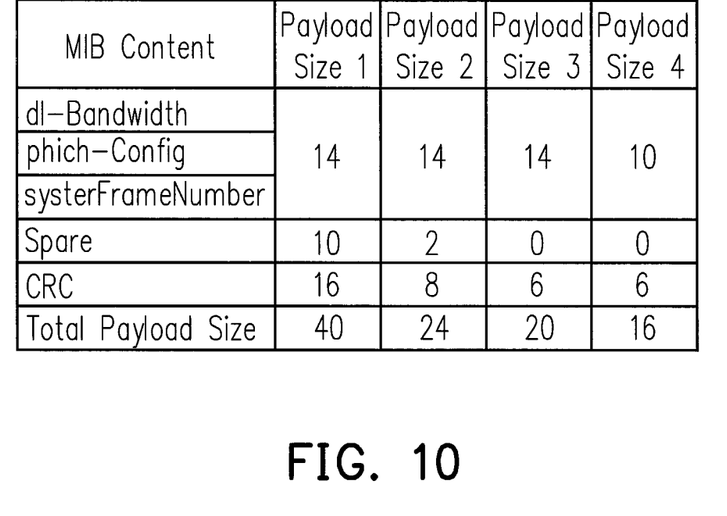
FIG. 10 illustrates ePBCH having at least four payload structures in accordance with one of the exemplary embodiments of the present disclosure.
Figure 11:
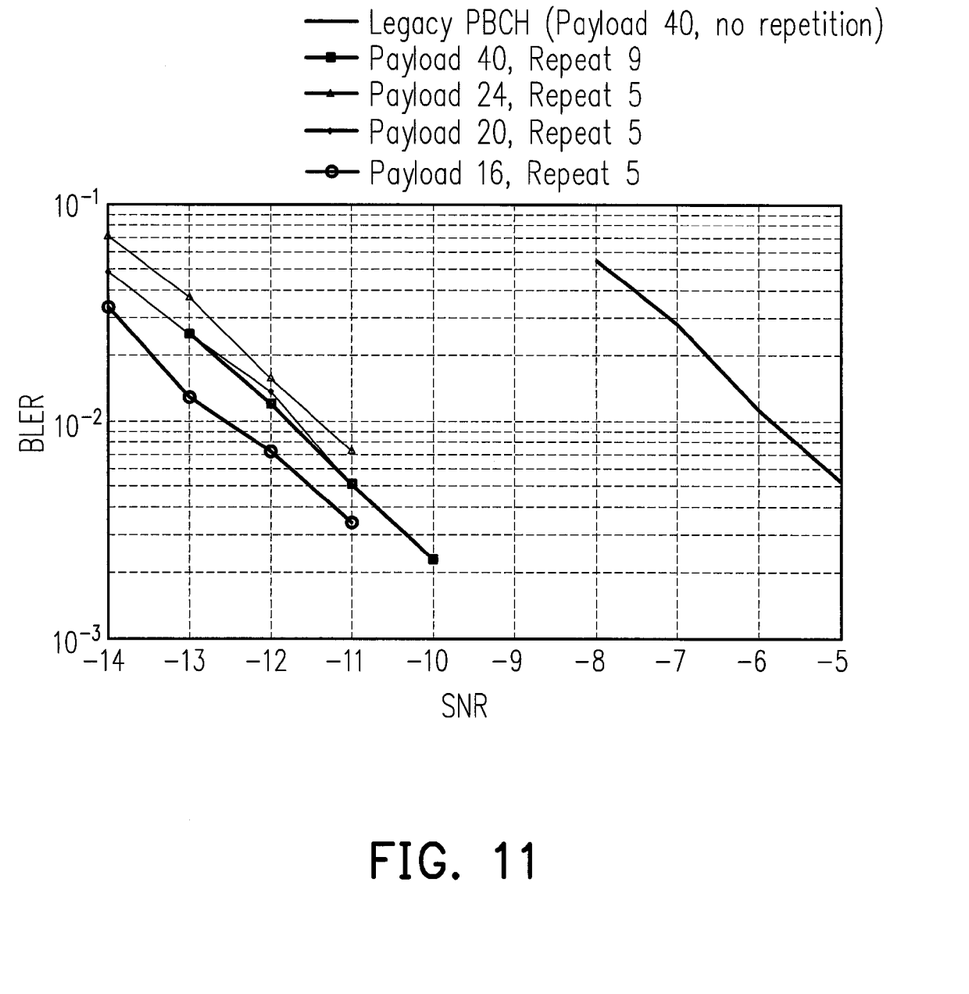
FIG. 11 illustrates a simulation result of using four different payload sizes in accordance with one of the exemplary embodiments of the present disclosure.

FIG. 10 illustrates ePBCH having at least four payload structures in accordance with one of the exemplary embodiments of the present disclosure. The payload size 1 is the legacy MIB transmitted through PBCH while payload size 2, 3, and 4 are reduced MIB to be transmitted through ePBCH. FIG. 11 illustrates a simulation result of using four different payload structures or payload modes in accordance with one of the exemplary embodiments of the present disclosure. It can be observed from the simulation result of FIG. 11 that the content reduction did provide significant performance gain. For example, by reducing the payload size to 20 (i.e. payload size 3), the required number of repetition is about half of the number of repetition without content reduction. Moreover, it can be observed that further performance reduction could be achieved by reducing the payload size to 16.

Figure 12:
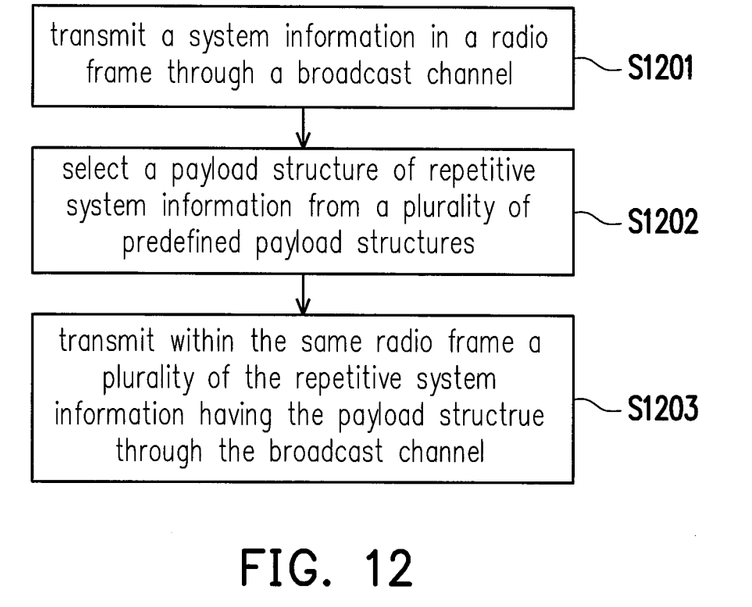
FIG. 12 illustrates the proposed method of radio coverage extension in accordance with one of the exemplary embodiments of the present disclosure.

FIG. 12 illustrates the proposed method of radio coverage extension in accordance with one of the exemplary embodiments of the present disclosure. The method would include at least but not limited to steps S1201~S1203. In step S1201, a base station would transmit a system information in a radio frame through a broadcast channel. In step S1202, the base station would select a payload structure of repetitive system information from a plurality of predefined payload structures which would include at least the first payload structure and a second payload structure. The first payload structure could have a first payload size, and the second payload structure could have a second payload size. The first payload size would be greater than the second payload size. In step S1203 the base station would transmit within the same radio frame a plurality of the repetitive system information having the payload structure through the broadcast channel in response to transmitting the system information. If the first payload structure has been selected in step S1202, there would be a N1 number of the repetitive system information. If the second payload structure has been selected in step S1202, there would be a N2 number of repetitive system information. N2 is smaller than or equal to N1.

In one of the exemplary embodiments, the first payload structure may have the same content as the system information. In one of the exemplary embodiments, the first payload structure may have reduced content relative to the system information.

In one of the exemplary embodiments, the method of FIG. 12 may further include selecting the payload structure of repetitive system information from a third payload structure having a third payload size which is smaller than the second payload size and transmitting within the same radio frame N3 number of the repetitive system information having the payload structure having the third payload size for N3. N3 is smaller than or equal to N2.

In one of the exemplary embodiments, the selection of the payload structure of repetitive system information from the plurality of predefined payload structures of the method shown in FIG. 12 is based on instantaneous data traffic so that the first payload size is preferred over the second payload size when the instantaneous data traffic has increased.

In one of the exemplary embodiments, the selection of the payload structure of repetitive system information from the plurality of predefined payload structures of the method shown in FIG. 12 is based on system requirement so that the first payload size is preferred over the second payload size when the system information has increased.

In one of the exemplary embodiments, the selection of the payload structure of repetitive system information from the plurality of predefined payload structures of the method shown in FIG. 12 is based on cell type so that the first payload size is preferred over the second payload size when the base station is a Macro cell.

Moreover, in one of the exemplary embodiments, the plurality of predefined payload structures may include at least but not limited to reduced system information content, reduced spare bits, and reduced error detecting code.

Figure 13:
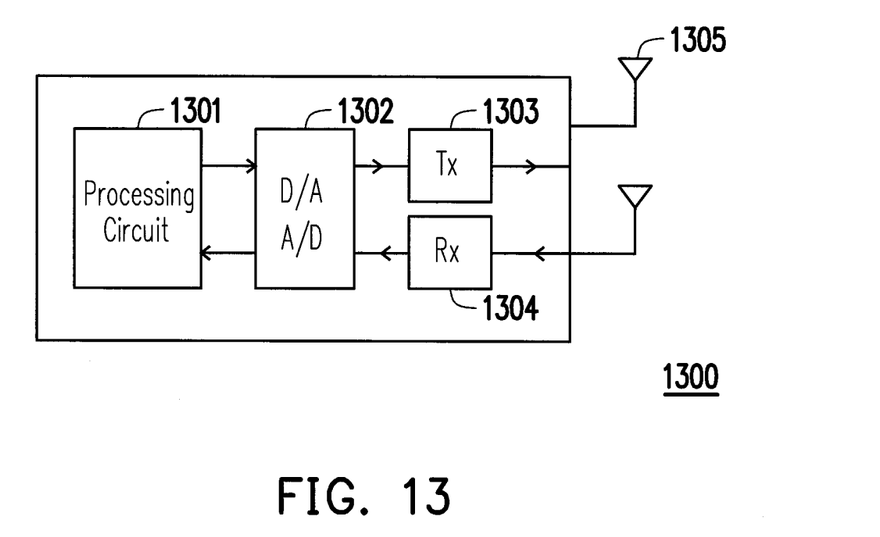
FIG. 13 illustrates an exemplary base station in accordance with one of the exemplary embodiments of the present disclosure.

FIG. 13 illustrates an exemplary base station in accordance with one of the exemplary embodiments of the present disclosure. The exemplary base station would include at least but not limited to a processing circuit 1301, an A/D/D/A converter 1302, a transmitter 1303, a receiver 1304, and one or more antenna units 1305. The transceiver circuit 303 transmits downlink signals and receives uplink signals wirelessly. The transceiver circuit 303 may also perform operations such as low noise amplifying, impedance matching, frequency mixing, up or down frequency conversion, filtering, amplifying, and so like. The analog-to-digital (A/D)/digital-to-analog (D/A) converter 304 is configured to convert from an analog signal format to a digital signal format during uplink signal processing and from a digital signal format to an analog signal format during downlink signal processing.

The processing circuit 1301 is configured to process digital signal and to perform procedures of the proposed method radio coverage extension in accordance with the aforementioned exemplary embodiments of the present disclosure. Also, the processing circuit 1301 may optionally be coupled to a non-transitory storage medium to store programming codes, device configurations, a codebook, buffered or permanent data, and so forth. The functions of the processing circuit 1301 could be implemented by using programmable units such as a micro-processor, a microcontroller, a DSP chips, FPGA, etc. The functions of the processing circuit 1301 may also be implemented with separate electronic devices or ICs, and the processing circuit may also be implemented with either hardware or software.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

In this disclosure, the term "base station" (BS) may represent any one of a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

In view of the aforementioned descriptions, the present disclosure is suitable for being used in a wireless communication system and is able to extend the coverage of a base station by repeating system information having a discrete possibility of reduced payload structures such that not only the coverage of a base station could be enhanced but also system resources could be reduced and system flexibilities could be enhanced.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A radio coverage extension method applicable to a base station, the method comprising:

transmitting a system information in a radio frame through a broadcast channel, wherein the system information is transmitted through a master information block (MIB);

selecting a payload structure of repetitive system information from a plurality of predefined payload structures comprising a first payload structure and a second payload structure, wherein the first payload structure has a first payload size, the second payload structure has a second payload size, and the first payload size is greater than the second payload size; and transmitting within the same radio frame a plurality of the repetitive system information having the payload structure through the broadcast channel in response to transmitting the system information, wherein when the first payload structure has been selected, there are N1 number of the repetitive system information, when the second payload structure has been selected, there are N2 number of repetitive system information, and N2 is smaller than or equal to N1, wherein N1 and N2 are both integers greater than 0.

2. The method of claim 1, wherein the first payload structure has the same content as the system information.

3. The method of claim 1, wherein the first payload structure has reduced content relative to the system information.

4. The method of claim 1, wherein selecting the payload structure of repetitive system information from the plurality of predefined payload structures comprising:

selecting the payload structure of repetitive system information from a third payload structure having a third payload size which is smaller than the second payload size; and transmitting within the same radio frame N3 number of the repetitive system information having the payload structure having the third payload size for N3, wherein N3 is smaller than or equal to N2, wherein N3 is the integer greater than 0.

5. The method of 1, wherein selecting the payload structure of repetitive system information from the plurality of predefined payload structures comprising:

selecting the payload structure of repetitive system information from the plurality of predefined payload structures based on instantaneous data traffic so that the first payload size is preferred over the second payload size when the instantaneous data traffic has increased.

6. The method of 1, wherein selecting the payload structure of repetitive system information from the plurality of predefined payload structures comprising:

selecting the payload structure of repetitive system information from the plurality of predefined payload structures based on system requirement so that the first payload size is preferred over the second payload size when the system information has increased.

7. The method of 1, wherein selecting the payload structure of repetitive system information from the plurality of predefined payload structures comprising:

selecting the payload structure of repetitive system information from the plurality of predefined payload structures based on cell type so that the first payload size is preferred over the second payload size when the base station is a Macro cell.

8. The method of claim 1, wherein the plurality of predefined payload structures comprises reduced system information content.

9. The method of claim 1, wherein the plurality of predefined payload structures comprises reduced spare bits.

10. The method of claim 1, wherein the plurality of predefined payload structures comprises reduced error detecting code.

11. A base station comprising:
a transmitter, configured to transmit wireless data; and
a processing circuit, coupled to the transmitter and configured to:
  transmit a system information in a radio frame through a broadcast channel by using the transmitter, wherein the system information is transmitted through a master information block (MIB);
  select a payload structure of repetitive system information from a plurality of predefined payload structures comprising a first payload structure and a second payload structure, wherein
    the first payload structure has a first payload size, the second payload structure has a second payload size, and the first payload size is greater than the second payload size; and
  transmit within the same radio frame a plurality of the repetitive system information having the payload structure through the broadcast channel in response to transmitting the system information by using the transmitter, wherein
    when the first payload structure has been selected, there are N1 number of the repetitive system information, when the second payload structure has been selected, there are N2 number of repetitive system information, and N2 is smaller than or equal to N1, wherein N1 and N2 are both integers greater than 0.

12. The base station of claim 11, wherein the first payload structure has the same content as the system information.

13. The base station of claim 11, wherein the first payload structure has reduced content relative to the system information.

14. The base station of claim 11, wherein the processing circuit is configured for selecting the payload structure of repetitive system information from the plurality of predefined payload structures comprising:
  selecting the payload structure of repetitive system information from a third payload structure having a third payload size which is smaller than the second payload size; and
  transmitting within the same radio frame N3 number of the repetitive system information having the payload structure having the third payload size for N3, wherein N3 is smaller than or equal to N2, wherein N3 is the integer greater than 0.

15. The base station of 11, wherein the processing circuit is configured for selecting the payload structure of repetitive system information from the plurality of predefined payload structures comprising:
  selecting the payload structure of repetitive system information from the plurality of predefined payload structures based on instantaneous data traffic so that the first payload size is preferred over the second payload size when the instantaneous data traffic has increased.

16. The base station of 11, wherein the processing circuit is configured for selecting the payload structure of repetitive system information from the plurality of predefined payload structures comprising:
  selecting the payload structure of repetitive system information from the plurality of predefined payload structures based on system requirement so that the first payload size is preferred over the second payload size when the system information has increased.

17. The base station of 11, wherein the processing circuit is configured for selecting the payload structure of repetitive system information from the plurality of predefined payload structures comprising:
  selecting the payload structure of repetitive system information from the plurality of predefined payload structures based on cell type so that the first payload size is preferred over the second payload size when the base station is a Macro cell.

18. The base station of claim 11, wherein the plurality of predefined payload structures comprises reduced system information content.

19. The base station of claim 11, wherein the plurality of predefined payload structures comprises reduced spare bits.

20. The base station of claim 11, wherein the plurality of predefined payload structures comprises reduced error detecting code.

* * * * *